United States Patent [19]
Agrawal et al.

[11] Patent Number: 6,038,538
[45] Date of Patent: Mar. 14, 2000

[54] GENERATING PROCESS MODELS FROM WORKFLOW LOGS

[75] Inventors: Rakesh Agrawal; Dimitrios Gunopulos, both of San Jose, Calif.; Frank Leymann, Aidlingen; Dieter Helmut Roller, Schoenaich, both of Germany

[73] Assignee: International Business Machines Corporation, Armonk, N.Y.

[21] Appl. No.: 08/990,104

[22] Filed: Dec. 15, 1997

Related U.S. Application Data

[60] Provisional application No. 60/058,993, Sep. 15, 1997.

[51] Int. Cl.[7] .................................................. G06F 17/60
[52] U.S. Cl. .................. 705/7; 364/147; 364/472.06; 707/9; 707/10; 395/681; 395/682; 705/1; 709/201; 709/202
[58] Field of Search ................................. 705/1, 7, 8, 9, 705/11; 707/9, 10, 104; 395/500, 681, 682; 364/147, 472.06; 709/201, 202, 244

[56] References Cited

U.S. PATENT DOCUMENTS

| | | | |
|---|---|---|---|
| 5,058,000 | 10/1991 | Cox et al. ................................ | 707/10 |
| 5,097,533 | 3/1992 | Burger et al. ........................... | 395/500 |
| 5,115,501 | 5/1992 | Kerr ........................................ | 707/9 |
| 5,129,086 | 7/1992 | Coyle et al. ............................. | 395/682 |
| 5,182,705 | 1/1993 | Barr et al. ............................... | 705/11 |
| 5,216,592 | 6/1993 | Mann et al. ............................. | 705/8 |
| 5,265,252 | 11/1993 | Rawson, III et al. ................... | 395/681 |
| 5,278,978 | 1/1994 | Demers et al. .......................... | 707/101 |
| 5,301,320 | 4/1994 | McAtee et al. ......................... | 705/9 |
| 5,319,543 | 6/1994 | Wilhelm .................................. | 705/3 |
| 5,327,529 | 7/1994 | Fults et al. .............................. | 345/335 |
| 5,408,652 | 4/1995 | Hayashi et al. ......................... | 707/1 |
| 5,414,843 | 5/1995 | Nakamura et al. ..................... | 707/104 |
| 5,414,847 | 5/1995 | Tsukakoshi ............................. | 705/1 |
| 5,455,948 | 10/1995 | Poole et al. ............................. | 707/102 |
| 5,459,656 | 10/1995 | Fields et al. ............................ | 705/7 |
| 5,535,332 | 7/1996 | Ishida ..................................... | 395/200.35 |
| 5,535,389 | 7/1996 | Elder et al. ............................. | 395/712 |
| 5,548,506 | 8/1996 | Srinivasan .............................. | 705/8 |
| 5,581,691 | 12/1996 | Hsu et al. ............................... | 395/182.13 |
| 5,630,069 | 5/1997 | Flores et al. ............................ | 705/7 |
| 5,719,924 | 2/1998 | Haneda et al. ......................... | 379/100.03 |
| 5,822,570 | 10/1998 | Lacey ..................................... | 395/500 |

FOREIGN PATENT DOCUMENTS

| | | |
|---|---|---|
| 0 624 964 A1 | 11/1994 | European Pat. Off. . |
| 0 682 318 A1 | 11/1995 | European Pat. Off. . |

OTHER PUBLICATIONS

F. Leymann, et al., Managing Business Processes As An Information Resource, IBM Systems Journal, vol. 33, No. 2, pp. 326–348, 1994.

I. Kojima et al., Implementation Of An Object–Oriented Query Language System . . . Interface, IEEE, pp. 79–86, 1991.

(List continued on next page.)

*Primary Examiner*—Frantzy Poinvil
*Assistant Examiner*—Raquel Alvarez
*Attorney, Agent, or Firm*—Merchant & Gould P.C.

[57] ABSTRACT

A computer-implemented method, apparatus, and article of manufacture that constructs graph models from logs of past, unstructured executions of the given process. The graph model so produced conforms to the dependencies and past executions present in the log. By providing graph models that capture the previous executions of the process, this technique allows easier introduction of a workflow system and evaluation and evolution of existing processes.

49 Claims, 9 Drawing Sheets

OTHER PUBLICATIONS

A. Dogac et al., A Multidatabase System Implementation On CORBA, IEEE, pp. 2–11, 1996.

J.T. Anderson et al., Generic Database Interface (GDI) User Manual, Special Technical Report, Feb. 25, 1994.

D. Hollingsworth, Workflow Management Coalition—The Workflow Reference Model, Document No. TC00–1003, pp. 1–44, Nov. 28, 1994.

A.L. Scherr, A New Approach To Business Processes, IBM Systems Journal, vol. 32, No. 1, pp. 80–98, 1993.

C. Mohan, et al., Exotica: A Research Perspective On Workflow Management Systems, Data Engineering, vol. 18, No. 1, pp. 1–6, Mar. 1995.

A.V. Aho, The Transitive Reduction Of A Directed Graph, SIAM J. Comput, vol. 1, No. 2, pp. 131–137, Jun. 1972.

F. Leymann, et al., Managing Business Processes As An Information Resource, IBM Systems Journal, vol. 33, No. 2, pp. 326–348, 1994.

The NFS™ Distributed File Service, NFS White Paper, Mar. 1995.

IBM ImagePlus VisualInfo Information and Planning Guide, 1994 and 1995.

IBM ImagePlus VisualInfo Application Programming Reference, vol. 1, pp. 1–46, 1993–1995.

ERwin/Navigator User's Guide, pp. 1–7, 1996.

IBM Digital Library, Application Programming Guide for AIX and IRIX, Version 1, Document No. SC26–8654–00, pp. 1–134, 1996.

IBM Digital Library, Integrating Multimedia Server for AIX, Version 1, Document No. GC26–8872–01, pp. 1–23, 1996.

IBM Database 2, SQL Reference For Common Servers, Version 2, pp. 25–75, 1994–1995.

R. Agrawal, et al., Mining Sequential Patterns, IBM Almaden Research Center, pp. 1–12, Mar. 1995.

R. Srikant, et al., Mining Sequential Patterns: Generalizations and Performance Improvements, IBM Almaden Research Center, pp. 1–15, Mar. 1996.

GENERATING PROCESS MODELS FROM WORKFLOW LOGS

CROSS-REFERENCE TO RELATED APPLICATIONS

The present invention claims the benefit under 35 U.S.C. §119(e) of U.S. Provisional application Ser. No. 60/058,993, filed Sep. 15, 1997, by Rakesh Agrawal, Dimitrios Gunopulos, Frank Leymann, and Dieter Roller, and entitled "MINING PROCESS MODELS FROM WORKFLOW LOGS", which application is incorporated by reference herein.

BACKGROUND OF THE INVENTION

1. Field of the Invention

The present invention relates generally to computer-implemented methods for generating process models, and in particular, to a method, apparatus, and article of manufacture for generating process models from workflow logs.

2. Description of Related Art

Organizations typically prescribe how business processes have to be performed, particularly when activities are complex and involve many people. A business process specifies the way in which the resources of an enterprise are used. The performance of an enterprise depends on the quality and the accuracy of the business process. Thus techniques to manage and support business processes are an active research area, as described in the publications F. Casati, S. Ceri, B. Pernici and G. Pozzi, "Workflow Evolution", Proceedings of ER '96, Springer Verlag, Cottbus, Germany, October 1996, and F. Leymann and W. Altenhuber, "Managing Business Processes as an Information Resource", IBM Systems Journal, February 1994, both of which are incorporated by reference herein.

In particular, a significant amount of research has been done in the area of modeling and supporting the execution of business processes. The model generally used is the workflow model, as described in the publication D. Hollinsworth, "The Workflow Reference Model", Workflow Management Coalition, TC00-1003, December 1994, which is incorporated by reference herein. Workflow systems assume that a process can be divided in small, unitary actions, called activities. To perform the process, one must perform the set (or perhaps a subset) of the activities that comprise it. In addition, there may be dependencies between different activities.

The main approach used in workflow systems is to model the process as a directed graph. The graph vertices represent individual activities and the edges represent dependencies between them. In other words, if activity A has to be executed before activity B, an edge appears in the graph from A to B. In practice, certain executions of the process may include a given activity and others may not. Each edge A→B is, therefore, annotated with a Boolean function that determines whether the control flows from A to B.

Current workflow systems assume that a model of the process is available and the main task of the system is to insure that all the activities are performed in the right order and the process terminates successfully, as described in the publication F. Leymann and W. Altenhuber, "Managing Business Processes as an Information Resource", IBM Systems Journal, February 1994, which is incorporated by reference herein. The user is required to provide the process model. Constructing the desired process model from an unstructured model of process execution is quite difficult, expensive and in most cases require the use of an expert, as described in the publications F. Casati, S. Ceri, B. Pernici and G. Pozzi, "Workflow Evolution", Proceedings of ER '96, Springer Verlag, Cottbus, Germany, October 1996 and A. L. Scherr, "A New Approach to Business Processes", IBM Systems Journal, Vol. 32, No 1, 1993, both of which are incorporated by reference herein.

Thus, there is a need in the art for new approaches to the problem of model construction. More specifically, there is a need in the art for a method that generates a graph model of a process given a log of unstructured executions of the process, wherein the resulting graph represents the control flow of the business process. These and other needs are met by the present invention.

SUMMARY OF THE INVENTION

To address the requirements described above, the present invention discloses a computer-implemented method, apparatus, and article of manufacture that constructs graph models from logs of past, unstructured executions of the given process. The graph model so produced conforms to the dependencies and past executions present in the log. By providing graph models that capture the previous executions of the process, this technique allows easier introduction of a workflow system and evaluation and evolution of existing processes.

One object of the present invention is to generate a graph model of a process wherein the graph preserves all the dependencies between activities that are present in the log and permits all the executions of the process present in the log. Another object of the present invention is to generate a graph model of a process where the graph does not introduce spurious dependencies between activities. Finally, yet another object of the present invention is to generate a graph model of a process where the graph has the minimal number of edges.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
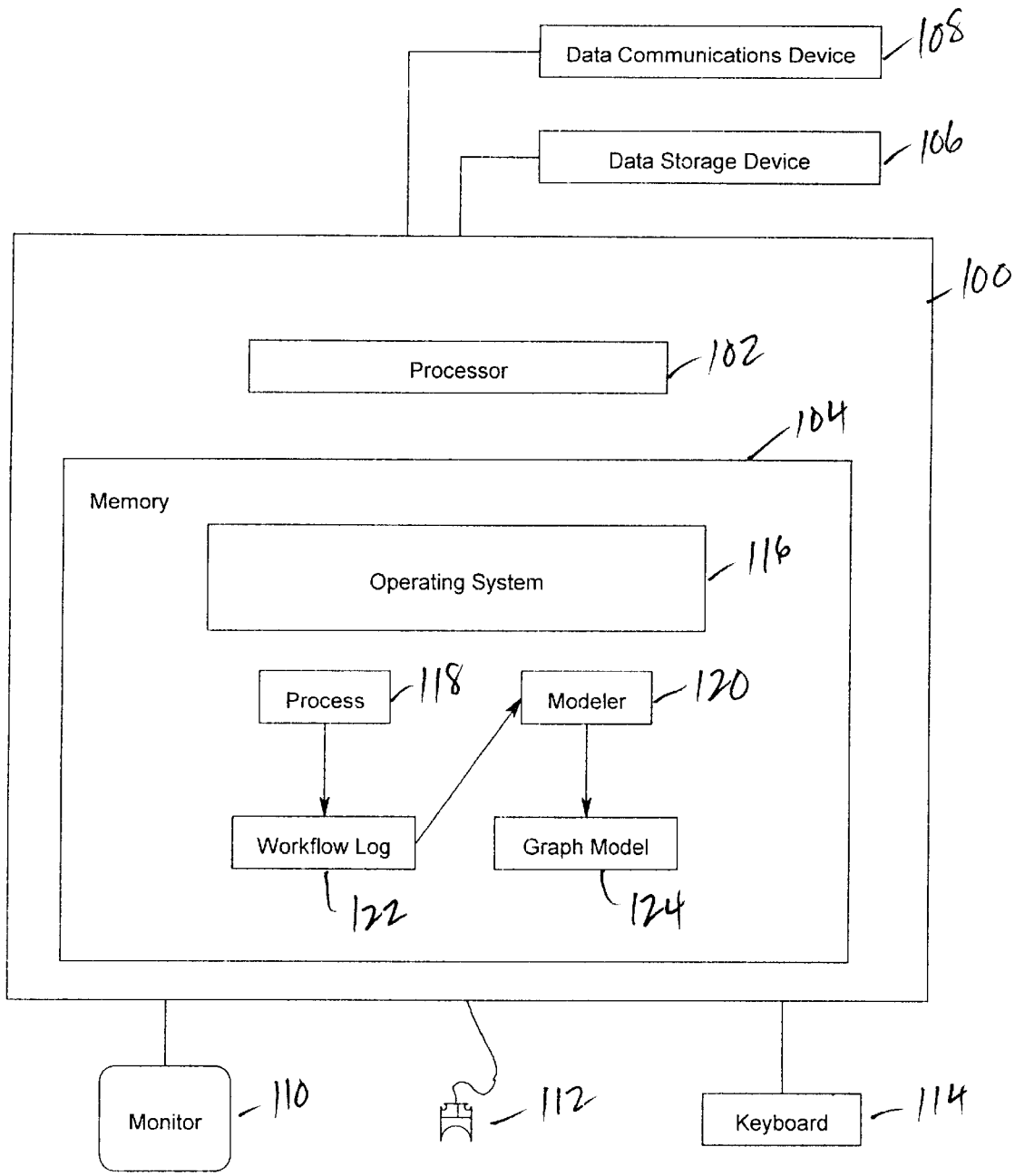
FIG. 1 is an exemplary hardware environment used to implement the preferred embodiment of the invention.

In the following description, reference is made to the accompanying drawings which formn a part hereof, and which is shown, by way of illustration, several embodiments of the present invention. It is understood that other embodiments may be utilized and structural changes may be made without departing from the scope of the present invention.

1. Overview

The present invention is a new approach to the problem of model construction. More specifically, the present specification describes a computer-implemented method that, given a log of unstructured executions of a process, generates a graph model of the process. The resulting graph represents the control flow of the business process and satisfies the following criteria:

Completeness: The graph should preserve all the dependencies between activities that are present in the log. It should also permit all the executions of the process present in the log.

Irredundancy: The graph should not introduce spurious dependencies between activities.

Minimality: To clarify the presentation, the graph should have the minimal number of edges.

The embodiment present herein has been done in the context of the Flowmark™ workflow product sold by IBM Corporation, the assignee of the present invention. The Flowmark™ product is described in the publication F. Leymann and W. Altenhuber, "Managing Business Processes as an Information Resource", IBM Systems Journal, February 1994, which is incorporated by reference herein. However, the process model is quite general and the methods provided herein are applicable to other workflow systems.

The new capabilities provided by the present invention can be applied in several ways. One way is to take logs of existing process executions and find a model that captures the process, which can ease the introduction of a workflow management system. In an enterprise with an installed workflow system, the present invention can help in the evaluation of the workflow system by comparing the synthesized process graphs with purported graphs. The present invention can also allow the evolution of the current process model into future versions of the model by incorporating feedback from successful process executions.

The following schema has been proposed in Flowmark™ for capturing the logs of existing processes in an enterprise that does not yet have a workflow system in place. First, all the activities in a process are identified. But, since the control flow is not yet known, all possible activities are presented to the user for consideration through a graphical interface displayed by the computer. The user selects the activities that, according to user's informal model of the business process, have to be executed next. Thus, the successful executions of the process are recorded.

With regard to related research, it is interesting to note that the problem considered in this paper generalizes the sequential patterns problem, as described in the publications R. Agrawal and R. Srikant, "Mining Sequential Patterns", 11th Int'l. Conf. on Data Engineering (DE-95), Taipei, Taiwan, March 1995, and H. Mannila, H. Toivonen and A. I. Verkamo, "Discovering Frequent Episodes in Sequences", 1st Int'l. Conf. on Knowledge Discovery in Databases and Data Mining (KDD-95), Montreal, Canada, August 1995, both which are incorporated by reference herein. On the other hand, the present invention is applicable in a more restricted setting.

Sequential patterns allow only a total ordering of fully parallel subsets, whereas process graphs are richer structures in that they can be used to model any partial ordering of the activities and admit cycles in the general setting. On the other hand, the present invention assumes that the activities form only one graph structure, whereas, in the sequential patterns problem, there is an interest in discovering all patterns that occur frequently.

It should also be noted here that the task of the present invention is different from the well-studied problem of finding a finite state automaton that accepts a given regular expression, as described in the publication A. Aho, J. Hopcroft and J. Ullman, "The Design and Analysis of Computer Algorithms", Addison-Welsley, 1974, which is incorporated by reference herein.

The semantics of a process graph is quite different from an automaton. Consider a simple process graph: ({S, A, B, E}, {S→A, A→E, S→B, B→E}), in which two activities A and B can proceed in parallel starting from an initiating activity S and followed by a terminating activity E. This process graph can generate SABE and SBAE as valid executions. The automaton that accepts these two strings is a quite different structure. In an automaton the activities (input tokens) are represented by the edges (transitions between states), while in a process graph the edges only represent control conditions and vertices represent activities. An activity appears only once in a process graph as a vertex label, whereas the same token (activity) may appear multiple times in an automaton.

The remainder of the present specification is organized as follows. In Section 2, the hardware environment of the present invention is described. In Section 3, the process model is described. In Section 4, the elements or steps of the present invention used to find a process graph are presented, assuming that the graph is acyclic and that each activity appears exactly once in each execution, wherein the present invention finds the minimal such graph in one pass over the log. In Section 5, these elements or steps of the present invention are extended to handle the case where some activities may not appear in each execution. In Section 6, the case of general directed graphs admitting cycles is considered. In these sections, an assumption is made that the log contains correct executions of the business process. However, this may not be the case in practice, and a strategy to deal with this problem is outlined in Section 7. A technique to compute the conditions on the edges is presented in Section 8. Section 9 presents implementation results using both synthetic datasets and logs from a Flowmark™ installation. The specification concludes with a summary in Section 10 and an Appendix in Section 11.

2. Hardware Environment

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as Windows, OS/2, Unix, etc. The operating system 116 is booted into the memory 104 of the computer 100 for execution when the computer 100 is powered-on or reset. In turn, the operating system 116 then controls the execution of one or more computer programs 118 and 120 and their associated data structures 122 and 124 by the computer 100. The present invention is generally implemented in these computer programs 118 and 120 and data structures 122 and 124, which execute under the control of the operating system 116 and cause the computer 100 to perform the desired functions as described herein.

In the preferred embodiment, computer program 118 comprises a modeled process and data structure 122 comprises a workflow log that records the executions of the process 118. In addition, computer program 120 comprises a modeler and data structure 124 comprises a graph model generated by the modeler 120 based on the recorded executions of the process 118 retrieved from the workflow log 122.

The operating system 116, process 118, modeler 120, workflow log 122, and graph model 124 are all comprised of instructions and/or data which, when read, executed, and/or interpreted by the computer 100, causes the computer 100 to perform the steps necessary to implement and/or use the present invention. Generally, the operating system 116, process 118, modeler 120, workflow log 122, and graph model 124 are all tangibly embodied in and/or readable from a device, carrier, or media, such as memory 102, data storage devices 106, and/or a remote device coupled to the computer 100 via the data communications devices 108. Under control of the operating system 116, the process 118, modeler 120, workflow log 122, and graph model 124 may be loaded from the memory 104, data storage devices 106, and/or remote devices into the memory 102 of the computer 100 for use during actual operations.

Thus, the present invention or any component thereof may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

3. Process Model

Business processes consist of separate activities. An activity is an action that is a semantical unit at some level. In addition, each activity can be thought of as a function that modifies the state of the process. Business processes are modeled as graphs with individual activities as nodes.

The edges on the graph represent the potential flow of control from one activity to another. For the purposes of the preferred embodiment, there is no differentiation between control flow and data flow, a distinction made in some systems, as described in the publication F. Leymann and W. Altenhuber, "Managing Business Processes as an Information Resource", IBM Systems Journal, February 1994, which is incorporated by reference herein. Each edge is associated with a Boolean function (on the state of the process), which determines whether the edge will be followed or not. If a vertex (activity) has more than one outgoing edge, the Boolean functions are independent from each other.

Formally, a process has an annotated directed acyclic graph (DAG) structure $G=(V,E)$. There is an output function $o: V \rightarrow N^k$ on the vertices. The output of each activity is a vector of k integer numbers. Finally, there is a Boolean function associated with each edge $f_{(u,v)}: N^k \rightarrow \{0,1\}$.

Definition 1 (Business process). A business process is defined as a set of activities $V_P = V_1, \ldots, V_n$, a directed graph $G_P = (V_P, E_P)$, an output function $O_P: V_P \rightarrow N^k$, $\forall (u, v) \in E_P$, and a Boolean function $f_{(u,v)}: N^k \rightarrow \{0,1\}$.

It is assumed that $G_P$ has a single source and a single sink. These are the process activating and terminating activities. If there are no such activities, an activating node with edges can be added to the first executed activities in the graph, and a terminating node with edges from the terminating activities of the process. The execution of the business process follows the activity graph: for each activity u that terminates, the output $o(u)$ is computed. Then, the functions on the outgoing edges are evaluated on the output. If $f_{(u,v)}(o(u))$ is true, then the present invention tests whether v can be executed. This test in general is a logical expression involving the activities that point to v in G. The details of input conditions on nodes are omitted herein; they can be learned using techniques similar to the ones proposed for learning output conditions on the edges. When v is ready, the outputs of incoming activities are passed as input to v, and it is inserted into a queue to be executed by the next available agent.

EXAMPLE 1

Figure 2:
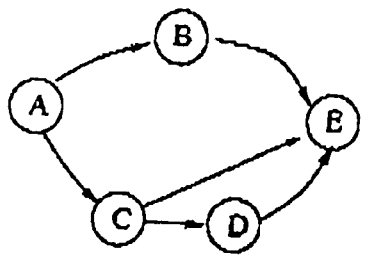
FIGS. 2, 3, 4A, 4B 6A, 6B, 8A, 8B, 8C, 10A, 10B, 11, 12, 13, 14, 15, and 16 are various representations of a graph model as constructed in the memory of a computer.

FIG. 2 illustrates a graph $G_P$ of a process P. The process consists of five activities $V_P = \{A,B,C,D,E\}$, wherein A is the starting activity and E is the terminating activity. The edges of the graph $G_P(E_P = \{(A,B), (A,C), (B,E), (C,D), (C,E), (D,E)\}$ represent the flow of execution, so that D always follows C, but B and C can happen in parallel. Not shown in FIG. 2 are $O_P$ and the Boolean conditions on the edges. Each activity has a set of 2 output parameters that are passed along the edges, $o(A), \ldots, o(E) \in N^2$. The output parameters are represented as a vector $(o(A)[1], o(A)[2])$. Each edge has a Boolean function on the parameters, such as $f_{(C,D)} = (o(C)[1]>0) \wedge (o(C)[2]<o(C)[1]))$. An execution of this process will include activity D depending on the output of C.

Each execution of a process is a list of events that record when each activity was started and when it terminated. Therefore, the log can be considered as a set of separate executions of an unknown underlying process graph.

Definition 2 (Execution log). The log of one execution of a process (or simply execution) is a list of event records (P,A,E,T,O), where P is the name of the process execution, A is the name of the activity, $E \in \{START,END\}$ is the type of the event, T is the time the event occurred, and $O=o(A)$ is the output of the activity if E=END and a null vector otherwise.

For notational simplicity, the process execution name is not written and output in the event records. Without loss of generality, it is assumed that the activities are instantaneous and no two activities start at the same time. With this simplification, an execution can be represented as a list of activities. This simplification is justified because if there are two activities in the log that overlap in time, then they must be independent activities. As will be described, the main challenge in inducing a process graph from a log of past executions lies in identifying dependency relationship between activities.

EXAMPLE 2

Figure 3:
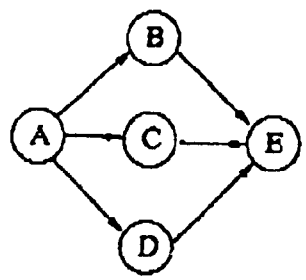

Sample executions of the graph illustrated in FIG. 3 are ABCE, ADCBE, ACDE.

Each execution is a partial ordering of a subgraph in a graph where the set of vertices is known. Therefore, if there exists a dependency between two activities in the real process, then these two activities will appear in the same order in each execution. However, only the executions that are recorded in the log are known, and so a dependency is defined between two activities with respect to the log. In the model graph, each dependency is represented either as a direct edge or as a path of edges, from an activity to another. Definition 3 (Direct following). If activity B starts after A terminates in each execution where they both appear, then B directly follows A.

Definition 4 (Dependence between activities). Given a log of executions of the same process, activity B follows A if either B directly follows A or there exists an activity C such that C follows A and B follows C. If B follows A but A does not follow B, then B depends on A. If A follows B and B follows A, or A does not follow B and B does not follow A, then A and B are independent.

Clearly, direct following between two activities does not imply dependence. However, any dependence between two activities can be broken down to a path of direct followings.

EXAMPLE 3

Consider the following set of executions: ABCE, ACDE, ADBE. B follows A (because B starts after A in the two executions both of them appear) but A does not follow B, therefore B depends on A. On the other hand, B follows D (because it is recorded after D in the only execution that both are present) and D follows B (because it follows C, which follows B), therefore B and D are independent.

Consider the effect when ADCE is added to the above set of executions. Now, B and D are no longer independent; rather, B depends on D. It is because B follows D as before, but C and D are now independent, so D does not follow B via C.

Given a log of executions, the concept of a dependency graph can be defined; that is, a graph that represents all the dependencies found in the log.

Definition 5 (Dependency graph). Given a set of activities V and a log of executions L of the same process, a directed graph $G_{VL}$ is a dependency graph if there exists a path from activity u to activity v in $G_{VL}$, if and only if v depends on u.

In general, for a given log, the dependency graph is not unique. In particular, two graphs with the same transitive closure represent the same dependencies.

Every execution of the process recorded in the log may not include all the activities of the process graph. This can happen when not all edges outgoing from an activity are taken (e.g., the execution ACE in FIG. 2). An execution R induces a subgraph G' of the process graph G=(V,E) in a natural way: G'=(V',E'), where V'={v∈V|v appears in R} and E'={(v, u)∈E|v terminates before u starts in R}.

Definition 6 (Consistency of an execution). Given a process model graph G=(V,E) of a process P and an execution R, then R is consistent with G if the activities in R are a subset V' of the activities in G, the induced subgraph G'=(V',(u,v) ∈E|u,v∈V'}) is connected, the first and last activities in R are process initiating and terminating activities, respectively, all nodes in V' can be reached from the initiating activity, and no dependency in the graph is violated by the ordering of the activities in R.

This definition of consistency is equivalent to the following one: R can be a successful execution of P for suitably chosen activity outputs and Boolean edge functions.

EXAMPLE 4

The execution ACBE is consistent with the graph in FIG. 2, but ADBE is not.

Given a log of executions, a process model graph needs to be found that preserves all the dependencies present in the log. At the same time, the graph should not introduce spurious dependencies. The graph must also be consistent with all executions in the log. A graph that satisfies these conditions is called a conformal graph.

Definition 7 (Conformal graph). A process model graph G is conformed with a log L of executions if all of the following hold:

Dependency completeness: For each dependency in L, there exists a path in G.

Irredundancy of dependencies: There is no path in G between independent activities in L.

Execution completeness: G is consistent with every execution in L.

EXAMPLE 5

Figures 4A, 4B:
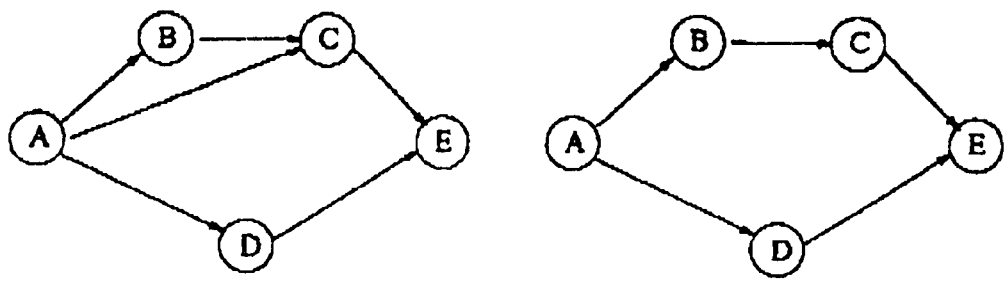

Consider the log {ADCE, ABCDE}. Both the first and second graphs in FIGS. 4A and 4B, respectively, are dependency graphs. The first graph is conformal, but the second graph is not because it does not allow the execution ADCE.

Problem statement. The following two problems are defined:

Problem 1 (Graph mining). Given a log of several executions of the same process, find a conformal process graph.

Problem 2 (Conditions mining). Given a log of several executions of the same process and a corresponding conformal process graph G=(V,E), find the Boolean functions $f_{(u,v)}$, (u,v)∈E.

Having thus divided the process model mining problem into two parts, Problem 1 is considered in Sections 4–7. Problem 2 is addressed in Section 8. Assume throughout that the process graph has |V|=n vertices, and the log contains m separate executions of the process. Generally, m>>n.

In Sections 4 and 5, it is assumed that the process graph is acyclic. This assumption is reasonable in many cases and, in fact, it is also frequently the case in practice, as described in the publication F. Leymann and W. Altenhuber, "Managing Business Processes as an Information Resource", IBM Systems Journal, February 1994, which is incorporated by reference herein. This assumption is relaxed in Section 6, which allows for cycles in the process graph.

4. Finding Directed Acyclic Graphs

In this section, the special case of finding model graphs for acyclic processes whose executions contain exactly one instance of every activity is considered. For this special case, a faster method can be obtained and provide the following minimality result: given a log of executions of the same process, such that each activity appears exactly once in each execution, there exists a unique process model graph that is conformal and minimizes the number of edges.

Lemma 1. Given a log of executions of the same process, such that each activity appears in each execution exactly once, if B depends on A then B starts after A terminates in every execution in the log.

Proof. Assume that this is not the case. Then, there exists an execution such that B starts before A terminates. From the definition of dependency, there must be a path of direct followings from A to B. But, since all activities are present in each execution, there must be at least one direct following which does not hold for the execution where B starts before A, which is a contradiction.

Lemma 2. Let G and G' be graphs with the same transitive closure. Then, both graphs are consistent with the same set of executions if each activity appears exactly once in each execution.

Proof. Since every activity appears in each execution, the induced subgraph for any execution is the original graph. The two graphs have the same transitive closure, so if there is a path between two activities in one, then there is a path between the same activities in the other. It follows that if a dependency is violated in one graph, then it must be violated in the other one.

Lemma 3. Given a log of executions of the same process, where all activities appear in each execution once, and a dependency graph G for this log, G is conformal.

Proof. By definition, the dependency graph preserves all the dependencies present in the log, and none other. For a given execution in the log, the induced subgraph is again the graph G because all activities are present. Further, no dependency is violated because if one was, it would not be in the dependency graph. It follows that G is conformal.

The method that finds the minimal conformal graph can now be specified.

Method 1 (Special DAG). Given a log L of executions of a process, find the minimal conformal graph G, assuming there are no cycles in the graph and each activity appears in each execution of the process.

1. Start with the graph G=(V, E), with V being the set of activities of the process and E being the set of edges where E=0. (V is instantiated as the log L is scanned in the next step.)
2. For each process in log L, and for each pair of activities u,v such that u terminates before v starts, add the edge (u,v) to E.
3. Remove from E the edges that appear in both directions.
4. Compute the transitive reduction of G. The transitive reduction of a directed graph G is the smallest subgraph of G that has the same closure as G, as described in the publication A. Aho, M. Garey and J. Ullman, "The Transitive Reduction of a Directed Graph", SIAM J. Comput., Vol. 1, No. 2, 131–137, 1972, which is incorporated by reference herein. Return (V,E).

Figure 5:
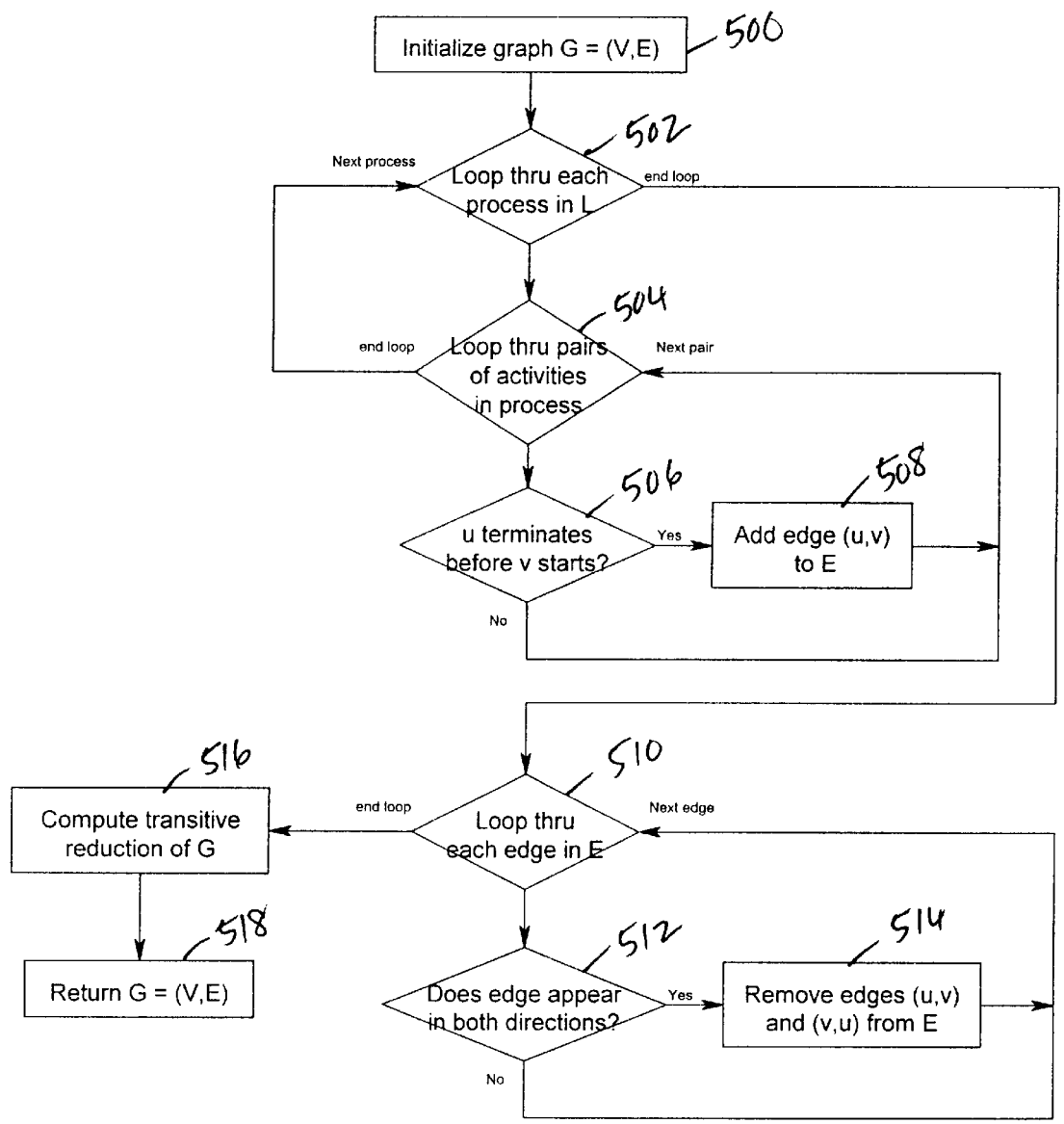
FIGS. 5, 7, 9, and 17 are various flowcharts illustrating the steps or elements of the present invention.

FIG. 5 is a flowchart that illustrates the logic performed by the modeler 120 for Method 1 (Special DAG) according to the present invention. Block 500 represents the modeler 120 initializing the graph model defined as G=(V, E), wherein V is the set of activities of the process, E is the set of edges, and E=0. Block 502 is a decision block that represents the modeler 120 performing a loop through each process represented in log L. Block 504 is a decision block that represents the modeler 120 performing a loop through each pair of activities u,v represented in log L. Block 506 is a decision block that represents the modeler 120 determining whether activity u terminates before activity v starts. If so, the control transfers to Block 508, which represents the modeler 120 adding the edge (u,v) to E. Control then transfers back to Block 504 for the next pair of the loop. Upon completion of the loop at Block 504, control transfers back to Block 502 for the next process of the loop. Upon completion of the loop at Block 502, control transfers to Block 510.

Block 510 is a decision block that represents the modeler 120 performing a loop through each edge in E. Block 512 is a decision block that represents the modeler 120 determining whether the edge appears in both directions. If so, control transfers to Block 514, which represents the modeler 120 removing the edges from E. Control then transfers back to Block 510 for the next edge of the loop. Upon completion of the loop at Block 510, control transfers to Block 516.

Block 516 represents the modeler 120 computing the transitive reduction of G, wherein the transitive reduction of a directed graph G is the smallest subgraph of G that has the same closure as G. Block 518 represents the modeler 120 terminating the logic by returning the graph model G=(V,E).

Theorem 1. Given a log of m executions of a given process having n activities, Method 1 computes the minimal conformal graph in $O(n^2 m)$ time.

Proof. First, it can be shown that after step 3 of Method 1, G is a dependency graph. From Lemma 1 it is known that each dependency is a direct following if all activities appear once in each execution. The edges removed form cycles of length 2, when there are activities u and v such that u follows v and v follows u; therefore, such edges cannot be dependencies.

After step 4 of Method 1, G is the minimal graph with the same transitive closure and, using Lemma 2, the minimal dependency graph.

Lemma 3 shows that this graph is also conformal and, since a conformal graph has to be a dependency graph, it is the minimal conformal graph.

Since m>>n, step 2 of Method 1 clearly dominates the running time. The running time of step 4 of Method 1 is $O(|V||E|)=O(n^3)$. (See Appendix).

EXAMPLE 6

Figure 6A:
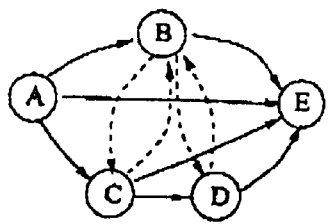
Figure 6B:
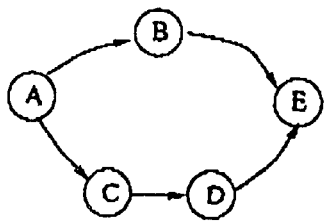

Consider the log {ABCDE, ACDBE, ACBDE}. After step 3 of the method, the first graph of FIG. 6A is obtained (the dashed edges are the edges that are removed at step 3 of Method 1), from which the underlying process model graph of FIG. 6B is obtained with the transitive reduction (step 4 of Method 1).

5. The Complete Method

The general case where every execution of an acyclic process does not necessarily include all the activities is now considered. The problem is that now not all dependency graphs are conformal graphs: it is possible to have a dependency graph that does not allow some executions present in the log. (See, Example 5).

In this section, a method that solves this problem is described. The method makes two passes over the log and uses a heuristic to minimize the number of the edges.

The method is a modification of Method 1. First, it computes a dependency graph. As before, those activities which ought to be treated as independent because they appear in reverse order in two separate executions are identified. In addition, to guard against spurious dependencies, those activity pairs A,B that have a path of direct followings from A to B as well as from B to A, and hence are independent, are also identified. To find such independent activities, the method finds the strongly connected components in the graph with the direct followings. For two activities in the same strongly connected component, there exist paths of direct followings from the one to the other; consequently, edges between activities in the same strongly connected component are removed.

The method must also ensure that the dependency graph is such that it allows all executions present in the log. Having so far formed a dependency graph, all edges that are not required for the execution of the activities in the log are removed. An edge can be removed only if all the executions are consistent with the remaining graph. To derive a fast method, the following alternative is used: for each execution, a minimal set of edges that are required to keep the graph consistent with the execution are identified and included in the final graph. The method can now be stated.

Method 2 (General DAG). Given a log L of m executions of a process, find the dependency graph G, assuming there are no cycles in the process graph.

1. Start with the graph G=(V, E), with V being the set of activities of the process and E being the set of edges where E=0. (V is instantiated as the log L is scanned in the next step.)
2. For each process execution in log L, and for each pair of activities u,v such that u terminates before v starts, add the edge (u,v) to E.
3. Remove from E the edges that appear in both directions.

4. For each strongly connected component of G, remove from E all edges between vertices in the same strongly connected component.
5. For each process execution in L:
   (a) Find the induced subgraph of G.
   (b) Compute the transitive reduction of the subgraph.
   (c) Mark those edges in E that are present in the transitive reduction.
6. Remove the unmarked edges in E.
7. Return(V, E).

Figure 7:
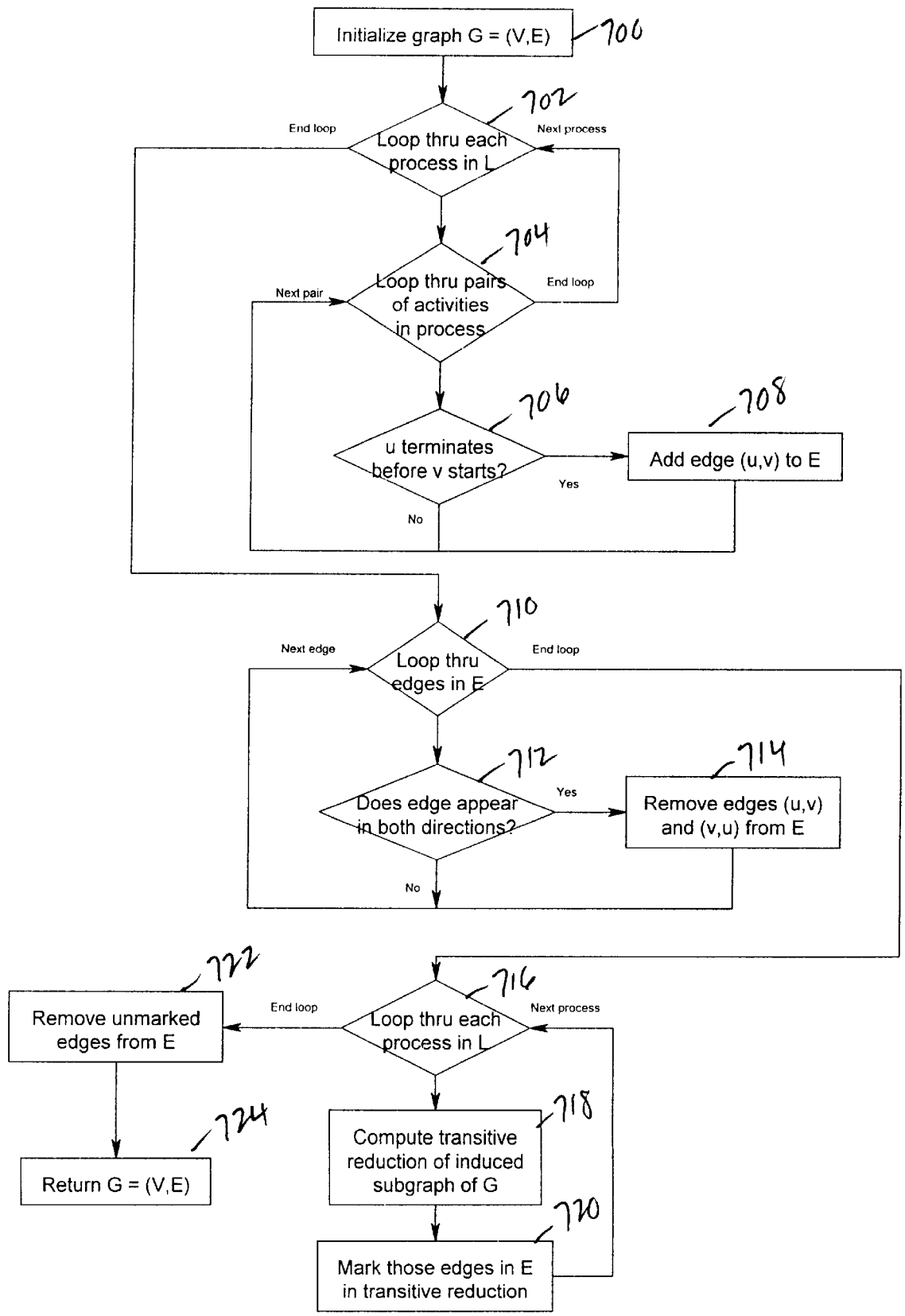

FIG. 7 is a flowchart that illustrates the logic performed by the modeler 120 for Method 2 (General DAG) according to the present invention. Block 700 represents the modeler 120 initializing the graph model defined as G=(V, E), wherein V is the set of activities of the process, E is the set of edges, and E=0. Block 702 is a decision block that represents the modeler 120 performing a loop through each process represented in log L. Block 704 is a decision block that represents the modeler 120 performing a loop through each pair of activities u,v for the process represented in log L. Block 706 is a decision block that represents the modeler 120 determining whether activity u terminates before activity v starts. If so, the control transfers to Block 708, which represents the modeler 120 adding the edge (u,v) to E. Control then transfers back to Block 704 for the next pair of the loop. Upon completion of the loop at Block 704, control transfers back to Block 702 for the next process of the loop. Upon completion of the loop at Block 702, control transfers to Block 710.

Block 710 is a decision block that represents the modeler 120 performing a loop through each edge in G. Block 712 is a decision block that represents the modeler 120 determining whether the edge appears in both directions. If so, control transfers to Block 714, which represents the modeler 120 removing the edges from E. Control then transfers back to Block 710 for the next edge in the loop. Upon completion of the loop at Block 710, control transfers to Block 716.

Block 716 is a decision block that represents the modeler 120 performing a loop through process represented in log L. Block 718 represents the modeler 120 computing the transitive reduction of the induced sub-graph of G for the process and Block 720 represents the modeler 120 marking those edges in E that are in the transitive reduction. Upon completion of the loop at Block 716, control transfers to Block 722.

Block 722 represents the modeler 120 removing unmarked edges from E. Block 724, which represents the modeler 120 terminating the logic by returning the graph model G=(V,E).

Theorem 2. Given a log of m executions of a given process having n activities, Method 2 computes a conformal graph in $O(mn^3)$ time.

Proof. After step 3 of Method 2, the method is left with a graph representing all the direct followings in L. Step 4 of Method 2 finds cycles in this graph and the set of vertices in each cycle represent independent activities by option. Thus, there is a dependency graph for log L after step 4 of Method 2. This graph maintains execution completeness, as step 2 of Method 2 created a graph that at least allows every execution in log L and steps 3–4 do not exclude any of them. Steps 5–6 of Method 2 retain only those edges from this graph that are necessary, for at least one execution in log L.

The running time is dominated by step 5 of Method 2 (m>>n), whose asymptotic time complexity is $O(mn^3)$.

EXAMPLE 7

Figure 8A:
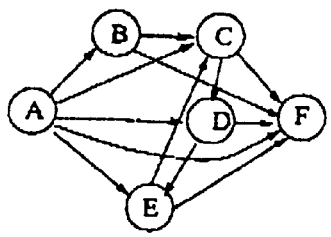
Figure 8B:
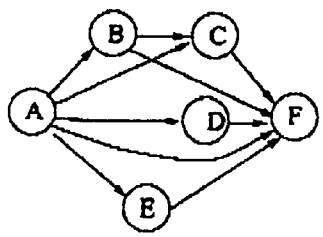
Figure 8C:
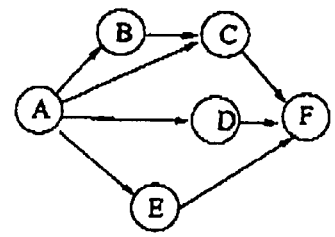

Consider the log {ABCF, ACDF, ADEF, AECF}. After step 2 of Method 2, the graph G is the first graph in FIG. 8A. Step 3 of Method 2 does not find any cycle of length 2. There is one strongly connected component, consisting of vertices C, D, E. After step 4 of Method 2, G is the second graph in FIG. 8B. Some of the edges are removed in step 6 of Method 2, resulting in the last graph in FIG. 8C.

6. Finding General Directed Graphs

If the process model graph can have cycles, the previous methods break down. The main problem is that legitimate cycles are going to be removed along with cycles created because two activities are independent and have appeared in different order in different executions. An additional problem is that, in the case of a directed graph with cycles, the transitive reduction operation does not have a unique solution.

A modification of the original approach works, however. The main idea is to treat different appearances of the same activity in an execution as two distinct activities.

A cycle in the graph results in multiple appearances of the same activity in a single process execution. Labeling is used to artificially differentiate the different appearances; for example, the first appearance of activity A is labeled $A_1$, the second $A_2$, and so on. Then, Method 2 is used on the new execution log.

The graph so computed contains, for each activity, an equivalent set of vertices that correspond to this activity. In fact, the size of the set is equal to the maximum number that the given activity is present in an execution log.

The final step is to merge the vertices of each equivalent set into one vertex. In doing so, an edge is put in the new graph if there exists an edge between two vertices of different equivalent sets of the original graph.

Method 3 (Cyclic Graphs). Given a log L of executions of a process, find the dependency graph G.

1. Start with the graph G=(V, E), with V being the set of activities of the process and E being the set of edges where E=0.
2. Go through each execution in the log L and uniquely identify each activity recorded in the log L, thus creating a new set of vertices V' and graph G=(V',E').
3. For each process execution in log L, and for each pair of activities u,v such that u terminates before v starts, add the edge (u,v) to E'. (In practice, steps 1–3 are executed together in one pass over the log L.)
4. Remove from E' the edges that appear in both directions.
5. For each strongly connected component of G, remove from E' all edges between vertices in the same strongly connected component.
6. For each process execution present in the log:
   (a) Find the induced subgraph of G'.
   (b) Compute the transitive reduction of the subgraph.
   (c) Mark those edges in E' that are present in the transitive reduction.
7. Remove the unmarked edges in E'.
8. In the graph so obtained, merge the vertices that correspond to different instances of the same activity in the graph, thus reverting to the original act of vertices V.
9. Return the resulting graph.

Figure 9:
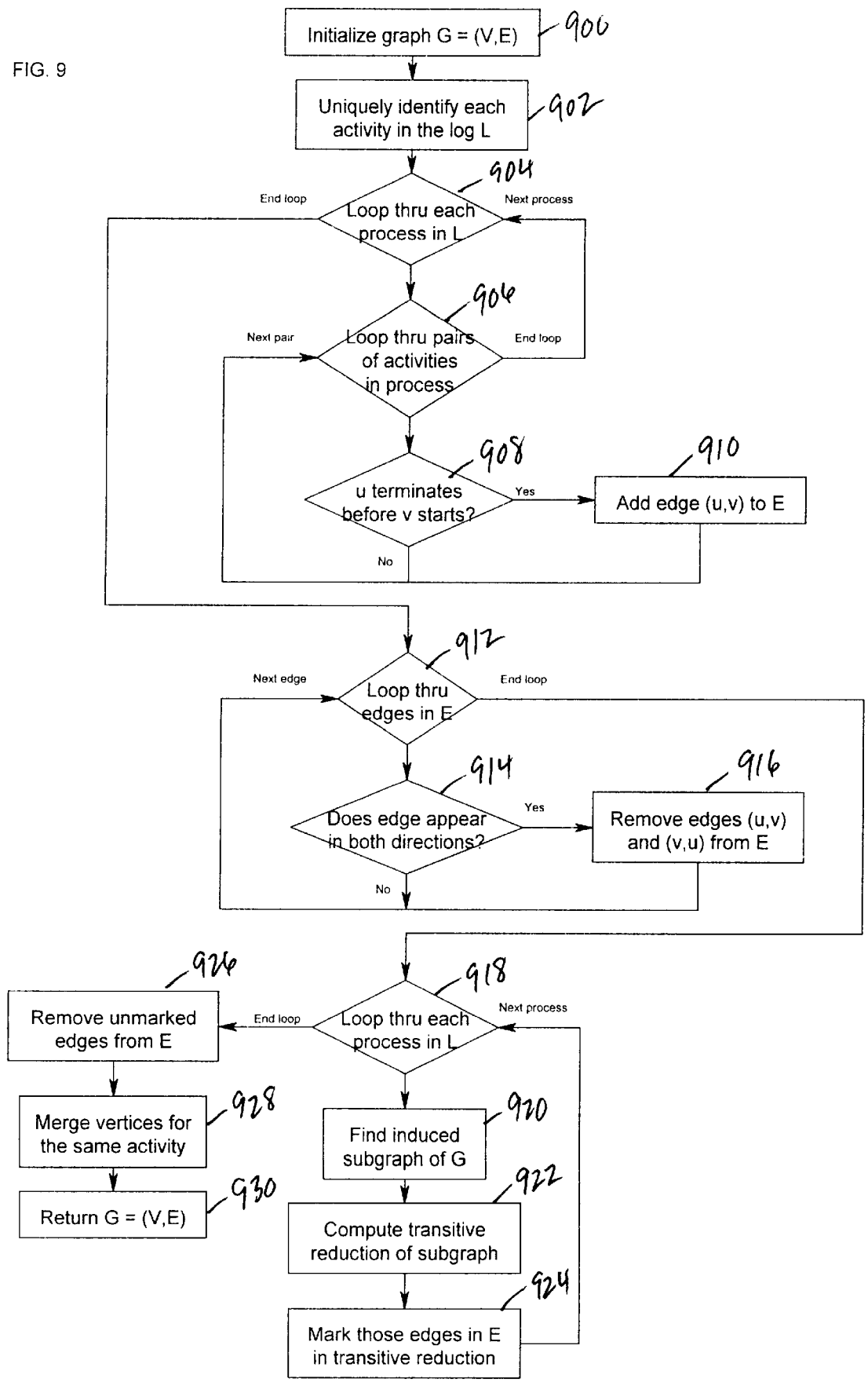

FIG. 9 is a flowchart that illustrates the logic performed by the modeler 120 for Method 3 (Cyclic DAG) according to the present invention. Block 900 represents the modeler 120 initializing the graph model defined as G=(V, E), wherein V is the set of activities of the process, E is the set of edges, and E=0. Block 902 represents the modeler 120 uniquely identifying each activity in the log L. Block 904 is a decision block that represents the modeler 120 performing a loop through each process represented in log L. Block 906 is a decision block that represents the modeler 120 performing a loop through each pair of activities u,v represented in log L. Block 908 is a decision block that represents the modeler 120 determining whether activity u terminates before activity v starts. If so, the control transfers to Block 910, which represents the modeler 120 adding the edge (u,v) to E. Control then transfers back to Block 906 for the next pair in the loop. Upon completion of the loop at Block 906, control transfers back to Block 904 for the next process in the loop. Upon completion of the loop at Block 904, control transfers to Block 912.

Block 912 is a decision block that represents the modeler 120 performing a loop through each edge in E. Block 914 is a decision block that represents the modeler 120 determining whether the edge appears in both directions. If so, control transfers to Block 916 which represents the modeler 120 removing the edges from E. Control then transfers back to Block 912 for the next edge in the loop. Upon completion of the loop at Block 912, control transfers to Block 918.

Block 918 is a decision block that represents the modeler 120 performing a loop through process represented in log L. Block 920 represents the modeler 120 finding the induced subgraph of G for the process. Block 922 represents the modeler 120 computing the transitive reduction of the induced sub-graph of G for the process. Block 924 represents the modeler 120 marking those edges in E that are in the transitive reduction. Control then transfers back to Block 918 for the next process of the loop. Upon completion of the loop at Block 918, control transfers to Block 926.

Block 926 represents the modeler 120 removing unmarked edges from E. Block 928 represents the modeler 120 merging all the vertices for the same activity. Block 930 represents the modeler 120 terminating the logic by returning the graph model G=(V,E).

Theorem 8. Given a log of m executions of a process having n activities with each activity repeated at most k times, Method 3 finds a conformal graph in $O(m(kn)^3)$ time.

EXAMPLE 8

Figure 10A:
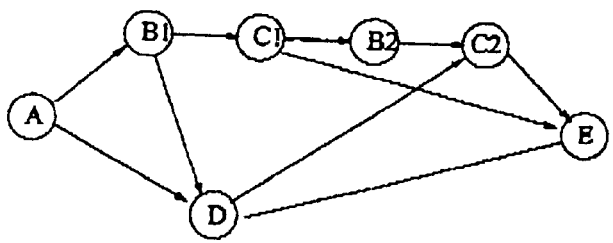
Figure 10B:
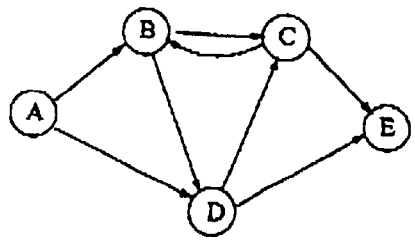

Consider the log {ABDCE, ABDCBCE, ABCBDCE, ADE}. The first graph in FIG. 10A is the graph computed before the merging of the activities. The result after the merging is the second graph in FIG. 10B, which shows the cycle consisting of the activities B and C.

7. Noise

A problem that has to be considered is noise in the log. This problem can arise because erroneous activities were inserted in the log, or some activities that were executed were not logged, or some activities were reported in out of order time sequence.

A slight modification is made to Method 3 to deal with these kinds of noise. The main change is in step 3, where a counter is added for each edge in E to register how many times this edge appears. Then, all edges with a count below a given threshold T are removed. The rationale is that errors in the logging of activities will happen infrequently. On the other hand, if two activities are independent, then their order of execution is unlikely to be the same in all executions.

One problem here is determining a good value for T. A few extra erroneous executions may change the graph substantially, as the following example illustrates.

EXAMPLE 9

Assume that the process graph is a chain with vertices A, B, C, D, E. Then, there is only one correct execution, namely ABCDE. Assume that the log contains m-k correct executions, and k incorrect executions of the form ADCBE. If the value of T is set lower than k, then Method concludes that activities B, C, and D are independent.

Assume that activities that must happen in sequence are reported out of sequence with an error rate of $\Gamma$. In addition, assume that $\Gamma<1/2$. Then, given m executions, the expected number of out of order sequences for a given pair of activities is $\Gamma m$. Clearly, T must be larger than $\Gamma m$. The probability that there are at least T errors, assuming they happen at random, is:

$$P[\text{more than } m - T \text{ errors in } m \text{ executions}] \leq \binom{m}{T}\varepsilon^T$$

In addition, assume that activities that are independent in the process graph are executed in random order. Then, the probability that they were executed in the same order in at least m-T executions is:

$$P[\text{more than } m - T \text{ executions in same order}] \leq \binom{m}{m-T}(1/2)^{(m-T)}$$

Then, Method 3 produces the correct graph with probability:

$$\delta \geq \max\left(\binom{m}{T}\varepsilon^T, \binom{m}{m-T}(1/2)^{(m-T)}\right)$$

Note that, if T increases, the probability of wrongly reporting an edge decreases, but the probability of adding an edge increases. If $\Gamma$ is approximately known, then:

$$\binom{m}{T}\varepsilon^T = \binom{m}{m-T}(1/2)^{(m-T)}$$

and from there:

$\Gamma^T=(1/2)^{(m-T)}$ and the value of T can be obtained that minimizes the probability that an error occurs.

8. Learning the Conditions

The control conditions can be arbitrary Boolean functions of some global process state. To obtain useful information about these functions, additional information about the changes in the global state of the process must be present in the log.

However, the simplifying assumption can be made that the control conditions are simple Boolean functions of the output of the activity, as described in the publication F. Leymann and W. Altenhuber, "Managing Business Processes as an Information Resource", IBM Systems Journal, February 1994, which is incorporated by reference herein.

In this case, the set of output parameters o(u) of a given activity u define the state of the activity. From each execution of an activity u, an example for all functions $f_{(u,v)}$, (u,v)∈E, can be obtained. If activity v is also executed in the same process execution, the example is a positive one; otherwise, it is a negative.

Formally, the training set for $f_{(u,v)}$ is defined as follows. For each execution of the process that u and v appear, the point $(o(u),1) \in N^k \times \{0,1\}$ is inserted. For each execution of the process that u but not v appears, the point $(o(u), 0) \in N^k \times \{0,1\}$ is inserted.

A classifier can now be used to learn the Boolean functions $f_{(v,u)}$, as described in the publication M. Mehta, R Agrawal and J. Rissanen, "SLIQ: A Fast Scalable Classifier for Data Mining", Proc. of the Fifth Int'l. Conf. on Extending Database Technology (EDBT), Avignon, France, March, 1996, which is incorporated by reference herein. In particular, the use of a decision tree classifier will give a set of simple rules that classify when a given activity is taken or not.

9. Implementation Results

In this section, results of applying the present invention to synthetic datasets, as well as logs obtained from a Flowmark™ installation, are presented. Both the synthetic datasets and the Flowmark™ logs are lists of event records consisting of the process name, the activity name, the event type, and the timestamp. The experiments were run on an RS/6000 250 workstation.

9.1 Synthetic Datasets

To generate a synthetic dataset, the process starts with a random directed acyclic graph, and using this as a process model graph, logs a set of process executions. The order of the activity executions follows the graph dependencies. The START activity is executed first and then all the activities that can be reached directly with one edge are inserted in a list. The next activity to be executed is selected from this list in random order. Once an activity A is logged, it is removed from the list, along with any activity B in the list such that there exists a (B, A) dependency. At the same time, A's descendants are added to the list. When the END activity is selected, the process terminates. In this way, not all activities are present in all executions.

Figure 11:
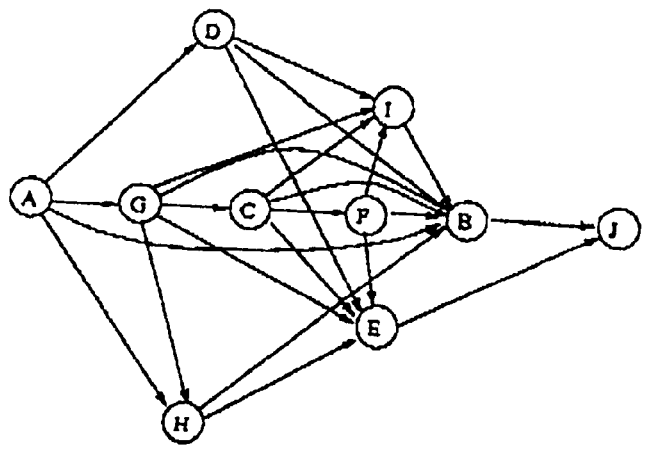

FIG. 11 illustrates a random process graph model with 10 activities (referred to as Graph 10) that was used in the experiments. Typical executions are ADBEJ, AGHEJ, ADGHBEJ, AGCFIBEJ. The same graph was generated by Method 3, with 100 random executions consistent with Graph 10.

Table 1 summarizes the execution times of the present invention for graphs of varying number of vertices and with logs having varying number of executions.

TABLE 1

Execution times in seconds (synthetic datasets)

| Number of executions | Number of vertices | | | |
|---|---|---|---|---|
| | 10 | 25 | 50 | 100 |
| 100 | 4.6 | 6.5 | 9.9 | 15.9 |
| 1000 | 46.6 | 64.6 | 100.4 | 153.2 |
| 10000 | 393.3 | 570.6 | 879.7 | 1385.1 |

The physical size of the log was roughly proportional to the number of recorded executions (all executions are not of equal length). For 10,000 executions, the size of the log was 46 MB, 62 MB, 85 MB and 107 MB for graphs with 10, 25, 50 and 100 vertices, respectively.

For practical graph sizes, the number of executions in the input is the dominant factor in determining the running time of the present invention. Table 1 shows that the present invention is fast and scales linearly with the size of the input for a given graph size. It also scales well with the size of the graph in the range size that were used in the experiments.

Table 2 presents the size of the graphs that the present invention generated for each of the experiments reported in Table 1.

TABLE 2

Number of edges in synthesized and original graphs (synthetic datasets)

| Number of vertices | | 10 | 25 | 50 | 100 |
|---|---|---|---|---|---|
| Edges Present | | 23 | 224 | 1058 | 4569 |
| Edges found | 100 | 23 | 172 | 791 | 1638 |
| with | 1000 | 23 | 224 | 1053 | 3712 |
| executions | 10000 | 23 | 224 | 1076 | 4301 |

The graphs derived by the present invention in these experiments were good approximations of the original graphs (checked by programmatically comparing the edge sets of the two graphs). When a graph has a large number of vertices, the log must correspondingly contain a large number of executions to capture the structure of the graph. Therefore, the largest graph was not fully found even with a log of 10000 executions. When the number of vertices was small, the original graphs were recovered even with a small number of executions. In the case of 50 vertices, the present invention eventually found a subgraph of the original graph. As was noted earlier, in the case when every execution of a process does not contain all the activities, the conformal graph for a given log is not unique. Heuristics are used to minimize the number of edges in the found graph.

9.2 Flowmark™ Datasets

An experiment was also performed with a set of logs from a Flowmark™ installation. Currently, Flowmark™ does not log the input and output parameter to the activities. Hence, we could not learn conditions on the edges. The correctness of the process model graphs mined was verified with the user. In every case, the present invention was able to recover the underlying process.

Table 3 summarizes the characteristics of the datasets and the execution times.

TABLE 3

Experiments with Flowmark datasets

| Process Name | Number of vertices | Number of edges | Number of executions | Size of the log | Execution time (seconds) |
|---|---|---|---|---|---|
| Upload_and_Notify | 7 | 7 | 134 | 792KB | 11.5 |
| StressSleep | 14 | 23 | 160 | 3685KB | 111.7 |
| Pend_Block | 6 | 7 | 121 | 505KB | 6.3 |
| Local_Swap | 12 | 11 | 24 | 463KB | 5.7 |
| UWI_Pilot | 7 | 7 | 134 | 779KB | 11.8 |

Figure 12:
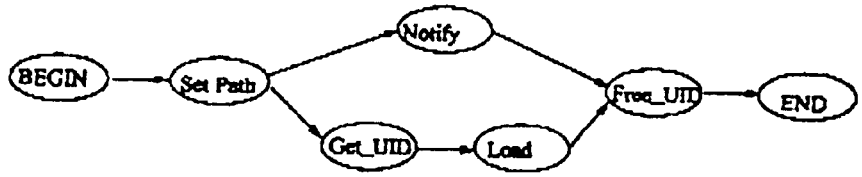
Figure 13:
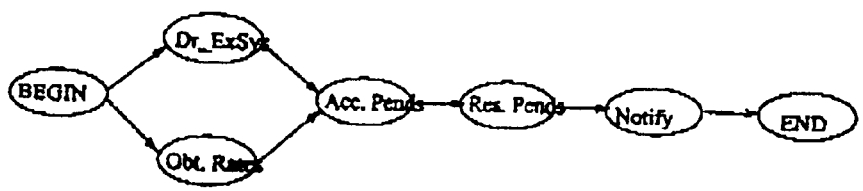
Figure 14:
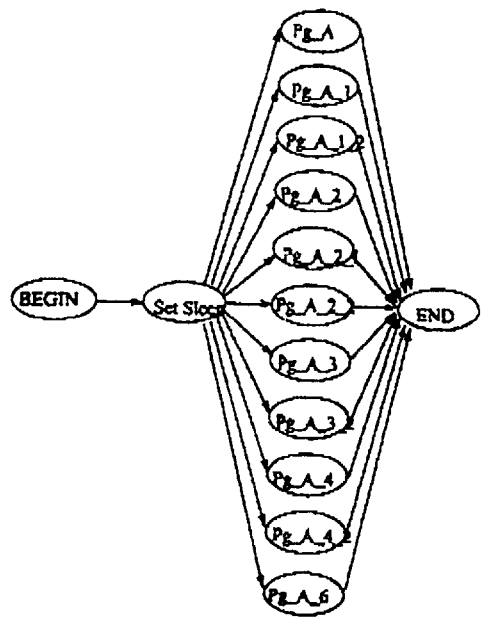
Figure 15:
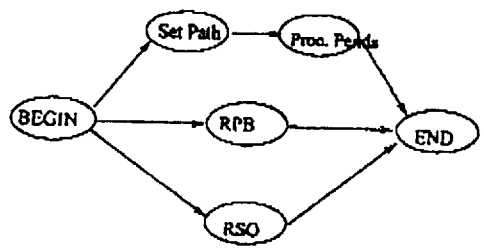
Figure 16:
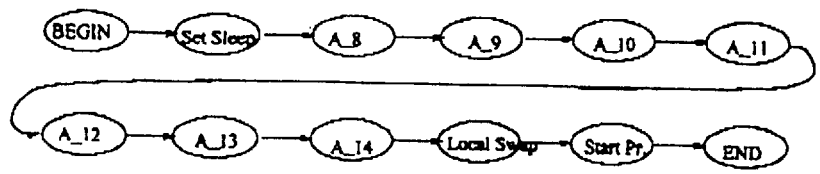

FIGS. 12–16 illustrate the process model graphs that were mined, wherein FIG. 12 is a graph model for a process Upload_and_Notify, FIG. 13 is a graph model for a process UWI_Pilot, FIG. 14 is a graph model for a process StressSleep, FIG. 15 is a graph model for a process Pend_Block; and FIG. 16 is a graph model for a process Local_Swap.

10. Summary

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any software program, application or operating system that generates any indicia of their executions could be modeled by the present invention.

In summary, the present invention discloses a method, apparatus, and article of manufacture that constructs graph models from logs of past, unstructured executions of the given process. The graph model so produced conforms to the dependencies and past executions present in the log. By providing graph models that capture the previous executions of the process, this technique allows easier introduction of a workflow system and evaluation and evolution of existing processes.

In modeling the process as a graph, the sequential patterns problem described in R. Agrawal and R. Srikant, "Mining Sequential Patterns", 11th Int'l. Conf. on Data Engineering (DE-95), Taipei, Taiwan, March 1995, which is incorporated by reference herein, can be generalized. The present invention is still practical, however, because it computes a single graph that conforms with all process executions.

The present invention has been implemented and tested with both real and synthetic data. The implementation uses model and log conventions from the Flowmark™ product, as described in the publication F. Leymann and W. Altenhuber, "Managing Business Processes as an Information Resource", IBM Systems Journal, February 1994, which is incorporated by reference herein. The results obtained from these experiments validated the scalability and usability of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

11. Appendix—Computing the Transitive Reduction

This appendix outlines a method to compute the transitive reduction of a directed acyclic graph. The fact that the graph being considered is known to be acyclic allows for a simpler method than the one described in the publication A. Aho, M. Garey and J. Ullman, "The Transitive Reduction of a Directed Graph", SIAM J. Comput., Vol. 1, No. 2, 131–137, 1972, which is incorporated by reference herein.

Lemma 9. Let $G=(V,E)$ be a directed acyclic graph, and let $G'=(V, E')$ be the transitive reduction of G. Then, $\forall (u, v) \in E$, $(u,v) \in G'$, if there exists no other path from u to v in G.

The method is based on this lemma. The method first finds the topological order of the directed acyclic graph. Two arrays of size $|V|$ for each vertex v are kept. One array keeps the descendants of v, and the other array the successors of v (that is, the nodes u such that $(v,u) \in E$). Then, each vertex is visited in reverse topological order.

Method 4 (TR). Given a directed acyclic graph $G=(V,E)$, find its transitive reduction.

1. Find a topological ordering of G.
2. For each v, let the successors of v be $succ(v)=\{u|(v,u) \in E\}$.
3. For each vertex v, in reverse topological order:
   (a) Set the descendants of v equal to the union of the descendants of its successors.
   (b) If a successor of v is also a descendant of v, remove it from the successors of v.
   (c) Add the remaining successors of v to its descendants.
4. Return the graph $(V, \{(v,u)|u \in succ(v)\}$.

Figure 17:
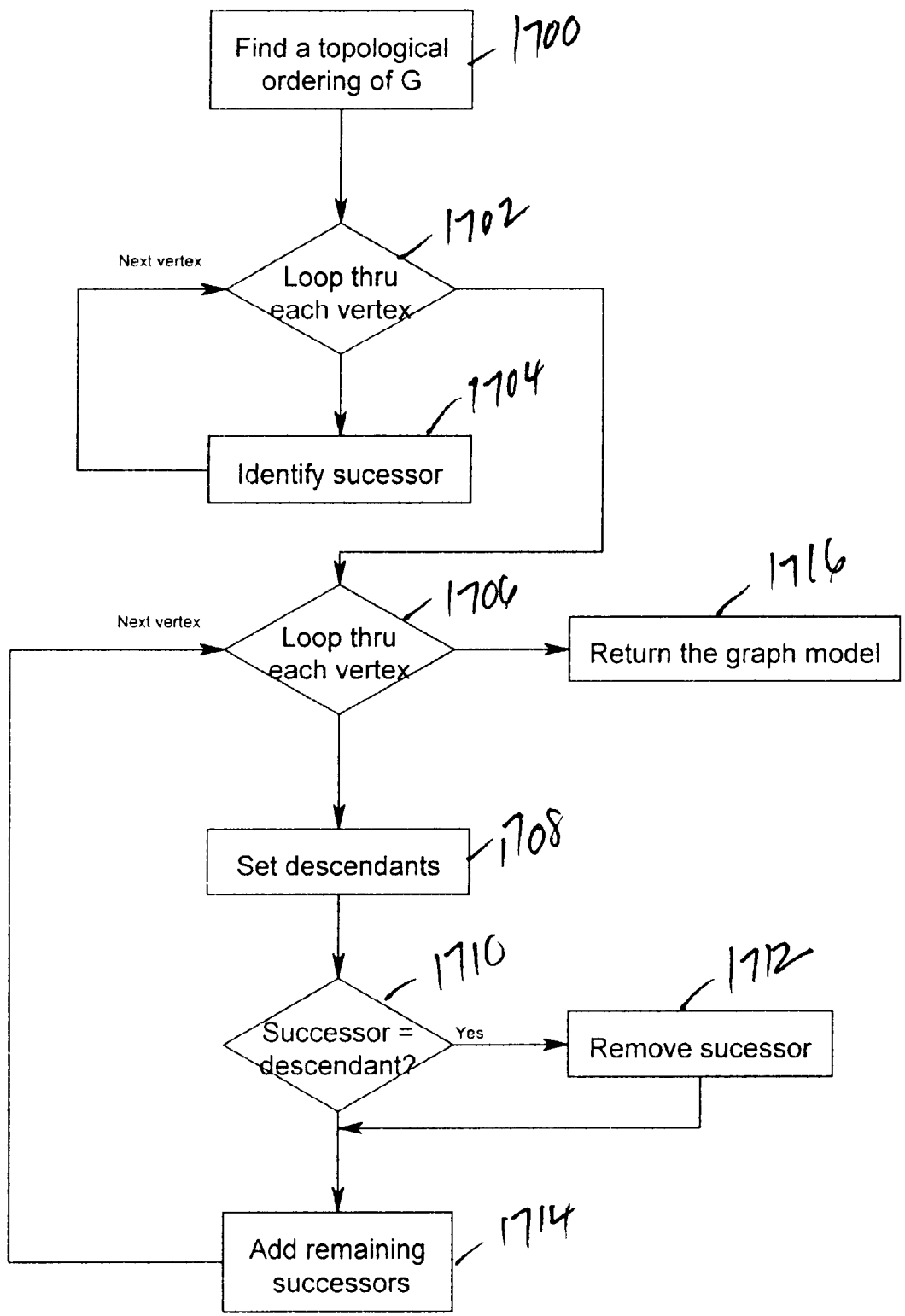

FIG. 17 is a flowchart that illustrates the logic performed by the modeler 120 for Method 4 (Transitive Reduction) according to the present invention. Block 1700 represents the modeler 120 finding a topological ordering of G. Block 1702 is a decision block that represents a loop through each vertex v. Block 1704 represents the modeler 120 identifying the successors of v as $such(v)=\{u|(v,u) \in E\}$. Upon completion of the loop, control transfers to Block 1706. Block 1706 is a decision block that represents the modeler 120 performing a loop through each vertex v, in reverse topological order. Block 1708 represents the modeler 120 setting the descendants of v equal to the union of the descendants of its successors. Block 1710 represents the modeler 120 determining whether a successor of v is also a descendant of v. If so, control transfers to Block 1712, which represents the modeler 120 removing the successor from the successors of vertex v. Block 1714 represents the modeler 120 adding the remaining successors of the vertex v to its descendants. Upon completion of the loop, Block 1716 represents the modeler 120 returning the graph $(V, \{(v,u)|u \in succ(v)\}$.

Theorem 10. Given a directed acyclic graph $G=(V,E)$, Method 4 computes its transitive reduction in $O(|V||E|)$ time.

Proof. The correctness of the method is straightforward from the discussion above. The running time is $O(|V||E|)$ because two $O(|V|)$ operations are performed for each edge in the graph.

What is claimed is:

1. A method of generating a graph model of a process executed by a computer, comprising the steps of:
   (a) under control of the computer, automatically identifying one or more records of activities representing one or more executions of the process from a log stored in the computer to determine patterns in the executions of the process; and
   (b) under control of the computer, automatically analyzing the log to identify relationships between the activities to create the graph model of the process.

2. The method of claim 1 above, wherein the graph model is a single graph.

3. The method of claim 1 above, wherein the graph model is compatible with all activities of the process.

4. The method of claim 1 above, wherein the graph model represents a control flow of a business process.

5. The method of claim 1 above, wherein the graph model preserves all dependencies between activities that are present in the log.

6. The method of claim 1 above, wherein the graph model permits all the activities of the process present in the log.

7. The method of claim 1 above, wherein the graph model does not introduce spurious dependencies between activities in the log.

8. The method of claim 1 above, wherein the process is defined as a set of activities $V_P=V_1, \ldots, V_n$, a graph model $G_P=(V_P,E_P)$, an output function $O_P: V_P \to N^k$, $\forall (u,v) \in E_P$, and a Boolean function $f_{(u,v)}: N^k \to \{0,1\}$.

9. The method of claim 1 above, wherein the record of one of the executions of the process is a list of event records (P, A, E, T, O ), where P is a name of the process's execution, A is a name of the activity, $E \in \{START, END\}$ is a type of an event associated with the activity, T is a time the event occurred, and $O=o(A)$ is an output of the activity when E=END and a null vector otherwise.

10. The method of claim 1 above, wherein when a second activity starts after a first activity terminates in the log, then the second activity directly follows the first activity.

11. The method of claim 1 above, wherein a second activity follows a first activity in the log when either the second activity directly follows the first activity or there exists a third activity such that the third activity follows the first activity and the second activity follows the third activity.

12. The method of claim 1 above, wherein when a second activity follows a first activity but the first activity does not follow the second activity in the log, then the second activity depends on the first activity.

13. The method of claim 1 above, wherein when the first activity follows a second activity and the second activity follows the first activity in the log, then the first and second activity are independent.

14. The method of claim 1 above, wherein the activities are defined as V and the log is defined as L, and the graph model is defined as $G_{VL}$, the graph model is a dependency graph when there exists a path from activity u to activity v in $G_{VL}$, if and only if v depends on u.

15. The method of claim 1 above, wherein the process is defined as P, one of the executions is defined as R, the graph model is defined as G=(V, E), R is consistent with G when the activities in R are a subset V' of the activities in G, the induced subgraph G'=(V', $\{(u,v) \epsilon E | u,v \epsilon V'\}$) is connected, the first and last activities in R are process initiating and terminating activities, respectively, all nodes in V' can be reached from the initiating activity, and no dependency in the graph is violated by the ordering of the activities in R.

16. The method of claim 1 above, wherein the log of all executions is defined as L, the graph model is defined as G, and G is conformed with L if all of the following hold:
   for each dependency in L, there exists a path in G;
   there is no path in G between independent activities in L; and
   G is consistent with every execution in L.

17. The method of claim 1 above, wherein the process is acyclic, its executions contain exactly one instance of every activity, and the graph model represents a directed acyclic graph.

18. The method of claim 17 above, wherein each activity appears exactly once in each execution in the log of executions of the acyclic process, the graph model is conformal, and the graph model contains a minimal a number of edges.

19. The method of claim 1 above, wherein each activity appears exactly once in each execution in the log of executions of the acyclic process, and a second activity depends on a first activity when the second activity starts after the first activity terminates in every execution recorded in the log.

20. The method of claim 1 above, wherein two graph models have a same transitive closure and the two graph models are consistent with a same set of executions if each activity appears exactly once in each execution.

21. The method of claim 1 above, wherein the graph model is conformal because all of the activities appear in each execution once.

22. The method of claim 1 above, wherein the process is acyclic and every execution of the process does not necessarily include all of the activities.

23. The method of claim 1 above, wherein a cycle in the graph model results in multiple appearances of an activity in a single execution of the process.

24. The method of claim 23 above, further comprising the step of labeling activities recorded in the log to differentiate multiple appearances of an activity.

25. The method of claim 24 above, wherein the graph contains, for each activity, an equivalent set of vertices that correspond to the activity.

26. The method of claim 25 above, further comprising the steps of merging the vertices of each equivalent set of vertices into one vertex and placing an edge in the graph model when there exists an edge between two vertices of different equivalent sets of vertices.

27. The method of claim 1 above, wherein the analyzing step further comprises the step of eliminating noise from the log.

28. The method of claim 27 above, wherein the eliminating step further comprises the steps of counting how many times each edge appears in the graph model and removing all edges from the graph model with a count below a specified threshold.

29. The method of claim 1 above, wherein the graph model is a directed acyclic graph and the computing step further comprises the step of computing a transitive reduction of the graph model.

30. A method of generating a graph model of a process executed by a computer, comprising the steps of:
   (a) retrieving one or more records of activities representing one or more executions of the process from a log stored in the computer to determine patterns in the executions of the process; and
   (b) analyzing the patterns in the computer to create the graph model of the process, wherein the graph model is defined as G=(V, E), V is a set of activities of the process, E is a set of edges of the graph model, the log is defined as L, and the analyzing step further comprises the steps:
      (1) initializing the graph model, wherein E is initially empty;
      (2) for each process in the log L and for each pair of activities u,v in the log L such that the activity u terminates before the activity v starts, add an edge (u,v) to E;
      (3) removing edges from E that appear in both directions; and
      (4) computing a transitive reduction of G, wherein the transitive reduction is a smallest sub-graph of G that has a same closure as G.

31. A method of generating a graph model of a process executed by a computer, comprising the steps of:
   (a) retrieving one or more records of activities representing one or more executions of the process from a log stored in the computer to determine patterns in the executions of the process; and
   (b) analyzing the patterns in the computer to create the graph model of the process, wherein the graph model is defined as G=(V, E), V is a set of activities of the process, E is a set of edges of the graph model, the log is defined as L, and the analyzing step further comprises the steps:
      (1) initializing the graph model, where E is initially empty;
      (2) for each process execution in the log L, and for each pair of activities u,v such that the activity u terminates before the activity v starts, add an edge (u,v) to E;
      (3) removing edges from E that appear in both directions;
      (4) for each strongly connected component of the graph model G, removing all edges from E that are between vertices in the strongly connected component;
      (5) for each process execution in the log L:
         (i) finding an induced sub-graph of G;
         (ii) computing a transitive reduction of the induced sub-graph of G; and
         (iii) marking those edges in E that are present in the transitive reduction; and
      (6) removing unmarked edges from E.

32. The method of claim 31 above, wherein there are no cycles in the graph model.

33. A method of generating a graph model of a process executed by a computer, comprising the steps of:
   (a) retrieving one or more records of activities representing one or more executions of the process from a log stored in the computer to determine patterns in the executions of the process; and (b) analyzing the patterns in the computer to create the graph model of the process, wherein the graph model is defined as G=(V, E), V is a set of activities of the process, E is a set of edges of the graph model, the log is defined as L, and the analyzing step further comprises the steps:
(1) initializing the graph model, where E is initially empty;
(2) examining each execution in the log L and uniquely identifying each activity recorded in the log L, so as to create a new set of vertices defined as V' and a new graph model defined as G=(V',E');
(3) for each process execution in the log L and for each pair of activities u,v such that the activity u terminates before the activity v starts, adding an edge (u,v) to E';
(4) removing edges from E' that appear in both directions;
(5) for each strongly connected component of the graph model G, removing all edges from E' that are between vertices in the strongly connected component;
(6) for each process execution present in the log L:
(i) finding an induced sub-graph of the graph model G';
(ii) computing a transitive reduction of the sub-graph; and
(iii) marking those edges in E' that are present in the transitive reduction;
(7) removing unmarked edges from E'; and
(8) in the graph model so obtained by steps (1)–(7) above, merging the vertices that correspond to different instances of a same activity in the graph model, thus reverting to an original act of vertices V.

34. A method of generating a graph model of a process executed by a computer, comprising the steps of:
(a) retrieving one or more records of activities representing one or more executions of the process from a log stored in the computer to determine patterns in the executions of the process; and
(b) analyzing the patterns in the computer to create the graph model of the process, wherein the analyzing step further comprises the steps of:
(1) finding a topological order of the graph model;
(2) maintaining two arrays for each vertex v of the graph model, wherein a first array stores descendants of the vertex v, and a second array stores successors of vertex v; and
(3) visiting each vertex in the graph model in reverse topological order.

35. The method of claim 34 above, wherein the analyzing step further comprises the steps of:
(1) finding the topological ordering of the graph model
(2) for each vertex v, identifying the successors of v as succ(v)={u|(v,u)∈E}; and
(3) for each vertex v and in reverse topological order:
(i) setting the descendants of the vertex v equal to a union of the descendants of the successors of vertex v;
(ii) if the successor of the vertex v is also the descendant of the vertex v, removing the successor of the vertex v; and
(iii) adding any remaining successors of the vertex v to the descendants of the vertex v.

36. A computer-implemented apparatus for generating a graph model of a process executed by a computer, comprising:
(a) a computer having a monitor attached thereto; and
(b) means, performed by the computer, for:
(1) under control of the computer, automatically identifying one or more records of activities representing one or more executions of the process from a log stored in the computer to determine patterns in the executions of the process; and
(2) under control of the computer, automatically analyzing the log to identify relationships between the activities to create the graph model of the process.

37. An article of manufacture comprising a computer program carrier readable by a computer and embodying one or more instructions executable by the computer to perform method steps of generating a graph model of a process executed by a computer, the method comprising the steps of:
(a) under control of the computer, automatically identifying one or more records of activities representing one or more executions of the process from a log stored in the computer to determine patterns in the executions of the process; and
(b) under control of the computer, automatically analyzing the log to identify relationships between the activities to create the graph model of the process.

38. A computer-implemented apparatus for generating a graph model of a process executed by a computer, comprising:
(a) a computer having a monitor attached thereto; and
(b) means, performed by the computer, for:
(i) retrieving one or more records of activities representing one or more executions of the process from a log stored in the computer to determine patterns in the executions of the process; and
(ii) analyzing the patterns in the computer to create the graph model of the process wherein the graph model is defined as G=(V, E), V is a set of activities of the process, E is a set of edges of the graph model, the log is defined as L, and the analyzing means further comprises means for:
(1) initializing the graph model, wherein E is initially empty;
(2) for each process in the log L and for each pair of activities u,v in the log L such that the activity u terminates before the activity v starts, add an edge (u,v) to E;
(3) removing edges from E that appear in both directions; and
(4) computing a transitive reduction of G, wherein the transitive reduction is a smallest sub-graph of G that has a same closure as G.

39. A computer-implemented apparatus for generating a graph model of a process executed by a computer, comprising:
(a) a computer having a monitor attached thereto; and
(b) means, performed by the computer, for:
(i) retrieving one or more records of activities representing one or more executions of the process from a log stored in the computer to determine patterns in the executions of the process; and
(ii) analyzing the patterns in the computer to create the graph model of the process, wherein the graph model is defined as G=(V, E), V is a set of activities of the process, E is a set of edges of the graph model, the log is defined as L, and the analyzing means further comprises means for:

(1) initializing the graph model, where E is initially empty;

(2) for each process execution in the log L, and for each pair of activities u,v such that the activity u terminates before the activity v starts, add an edge (u,v) to E;

(3) removing edges from E that appear in both directions;

(4) for each strongly connected component of the graph model G, removing all edges from E that are between vertices in the strongly connected component;

(5) for each process execution in the log L:
  (i) finding an induced sub-graph of G;
  (ii) computing a transitive reduction of the induced sub-graph of G; and
  (iii) marking those edges in E that are present in the transitive reduction; and (6) removing unmarked edges from E.

40. The apparatus of claim 39 above, wherein there are no cycles in the graph model.

41. A computer-implemented apparatus for generating a graph model of a process executed by a computer, comprising:

(a) a computer having a monitor attached thereto; and
(b) means, performed by the computer, for:
  (i) retrieving one or more records of activities representing one or more executions of the process from a log stored in the computer to determine patterns in the executions of the process; and
  (ii) analyzing the patterns in the computer to create the graph model of the process, wherein the graph model is defined as G=(V, E), V is a set of activities of the process, E is a set of edges of the graph model, the log is defined as L, and wherein the analyzing means further comprises means for:
    (1) initializing the graph model, where E is initially empty;
    (2) examining each execution in the log L and uniquely identifying each activity recorded in the log L, so as to create a new set of vertices defined as V' and a new graph model defined as G=(V',E');
    (3) for each process execution in the log L and for each pair of activities u,v such that the activity u terminates before the activity v starts, adding an edge (u,v) to E';
    (4) removing edges from E' that appear in both directions;
    (5) for each strongly connected component of the graph model G, removing all edges from E' that are between vertices in the strongly connected component;
    (6) for each process execution present in the log L:
      (i) finding an induced sub-graph of the graph model G';
      (ii) computing a transitive reduction of the sub-graph; and
      (iii) marking those edges in E' that are present in the transitive reduction;
    (7) removing unmarked edges from E'; and
    (8) in the graph model so obtained by means (1)–(7) above, merging the vertices that correspond to different instances of a same activity in the graph model, thus reverting to an original act of vertices V.

42. A computer-implemented apparatus for generating a graph model of a process executed by a computer, comprising:

(a) a computer having a monitor attached thereto; and
(b) means, performed by the computer, for:
  (i) retrieving one or more records of activities representing one or more executions of the process from a log stored in the computer to determine patterns in the executions of the process; and
  (ii) analyzing the patterns in the computer to create the graph model of the process, wherein the analyzing means further comprises means for:
    (1) finding a topological order of the graph model;
    (2) maintaining two arrays for each vertex v of the graph model, wherein a first array stores descendants of the vertex v, and a second array stores successors of vertex v; and
    (3) visiting each vertex in the graph model in reverse topological order.

43. The apparatus of claim 42 above, wherein the analyzing means further comprises means for:

(1) finding the topological ordering of the graph model
(2) for each vertex v, identifying the successors of v as such(v)={u|(v,u)∈E}; and
(3) for each vertex v and in reverse topological order:
  (i) setting the descendants of the vertex v equal to a union of the descendants of the successors of vertex v;
  (ii) if the successor of the vertex v is also the descendant of the vertex v, removing the successor of the vertex v; and
  (iii) adding any remaining successors of the vertex v to the descendants of the vertex v.

44. An article of manufacture comprising a computer program carrier readable by a computer and embodying one or more instructions executable by the computer to perform method steps of generating a graph model of a process executed by a computer, the method comprising the steps of:

(a) retrieving one or more records of activities representing one or more executions of the process from a log stored in the computer to determine patterns in the executions of the process; and (b) analyzing the patterns in the computer to create the graph model of the process, wherein the graph model is defined as G=(V, E), V is a set of activities of the process, E is a set of edges of the graph model, the log is defined as L, and the analyzing step further comprises the steps:
  (1) initializing the graph model, wherein E is initially empty;
  (2) for each process in the log L and for each pair of activities u,v in the log L such that the activity u terminates before the activity v starts, add an edge (u,v) to E;
  (3) removing edges from E that appear in both directions; and
  (4) computing a transitive reduction of G, wherein the transitive reduction is a smallest sub-graph of G that has a same closure as G.

45. An article of manufacture comprising a computer program carrier readable by a computer and embodying one or more instructions executable by the computer to perform method steps of generating a graph model of a process executed by a computer, the method comprising the steps of:

(a) retrieving one or more records of activities representing one or more executions of the process from a log stored in the computer to determine patterns in the executions of the process; and (b) analyzing the patterns in the computer to create the graph model of the process, wherein the graph model is defined as G=(V, E), V is a set of activities of the process, E is a set of edges of the graph model, the log is defined as L, and the analyzing step further comprises the steps:
(1) initializing the graph model, where E is initially empty;
(2) for each process execution in the log L, and for each pair of activities u,v such that the activity u terminates before the activity v starts, add an edge (u,v) to E;
(3) removing edges from L that appear in both directions;
(4) for each strongly connected component of the graph model G, removing all edges from E that are between vertices in the strongly connected component;
(5) for each process execution in the log L:
 (i) finding an induced sub-graph of G;
 (ii) computing a transitive reduction of the induced sub-graph of G; and
 (iii) marking those edges in E that are present in the transitive reduction; and
(6) removing unmarked edges from E.

46. The article of manufacture of claim 45 above, wherein there are no cycles in the graph model.

47. An article of manufacture comprising a computer program carrier readable by a computer and embodying one or more instructions executable by the computer to perform method steps of generating a graph model of a process executed by a computer, the method comprising the steps of:
(a) retrieving one or more records of activities representing one or more executions of the process from a log stored in the computer to determine patterns in the executions of the process; and
(b) analyzing the patterns in the computer to create the graph model of the process, wherein the graph model is defined as G=(V, E), V is a set of activities of the process, E is a set of edges of the graph model, the log is defined as L, and the analyzing step further comprises the steps:
 (1) initializing the graph model, where E is initially empty;
 (2) examining each execution in the log L and uniquely identifying each activity recorded in the log L, so as to create a new set of vertices defined as V' and a new graph model defined as G=(V',E');
 (3) for each process execution in the log L and for each pair of activities u,v such that the activity u terminates before the activity v starts, adding an edge (u,v) to E';
 (4) removing edges from E' that appear in both directions;
 (5) for each strongly connected component of the graph model G, removing all edges from E' that are between vertices in the strongly connected component;
 (6) for each process execution present in the log L:
  (i) finding an induced sub-graph of the graph model G';
  (ii) computing a transitive reduction of the sub-graph; and
  (iii) marking those edges in E' that are present in the transitive reduction;
 (7) removing unmarked edges from E'; and
 (8) in the graph model so obtained by steps (1)–(7) above, merging the vertices that correspond to different instances of a same activity in the graph model, thus reverting to an original act of vertices V.

48. An article of manufacture comprising a computer program carrier readable by a computer and embodying one or more instructions executable by the computer to perform method steps of generating a graph model of a process executed by a computer, the method comprising the steps of:
(a) retrieving one or more records of activities representing one or more executions of the process from a log stored in the computer to determine patterns in the executions of the process; and
(b) analyzing the patterns in the computer to create the graph model of the process, wherein the analyzing step further comprises the steps of:
 (1) finding a topological order of the graph model;
 (2) maintaining two arrays for each vertex v of the graph model, wherein a first array stores descendants of the vertex v, and a second array stores successors of vertex v; and
 (3) visiting each vertex in the graph model in reverse topological order.

49. The article of manufacture of claim 48 above, wherein the analyzing step further comprises the steps of:
(1) finding the topological ordering of the graph model
(2) for each vertex v, identifying the successors of v as $succ(v)=\{u|(v,u)\in E\}$; and
(3) for each vertex v and in reverse topological order:
 (i) setting the descendants of the vertex v equal to a union of the descendants of the successors of vertex v;
 (ii) if the successor of the vertex v is also the descendant of the vertex v, removing the successor of the vertex v; and
 (iii) adding any remaining successors of the vertex v to the descendants of the vertex v.

* * * * *